2,646,550

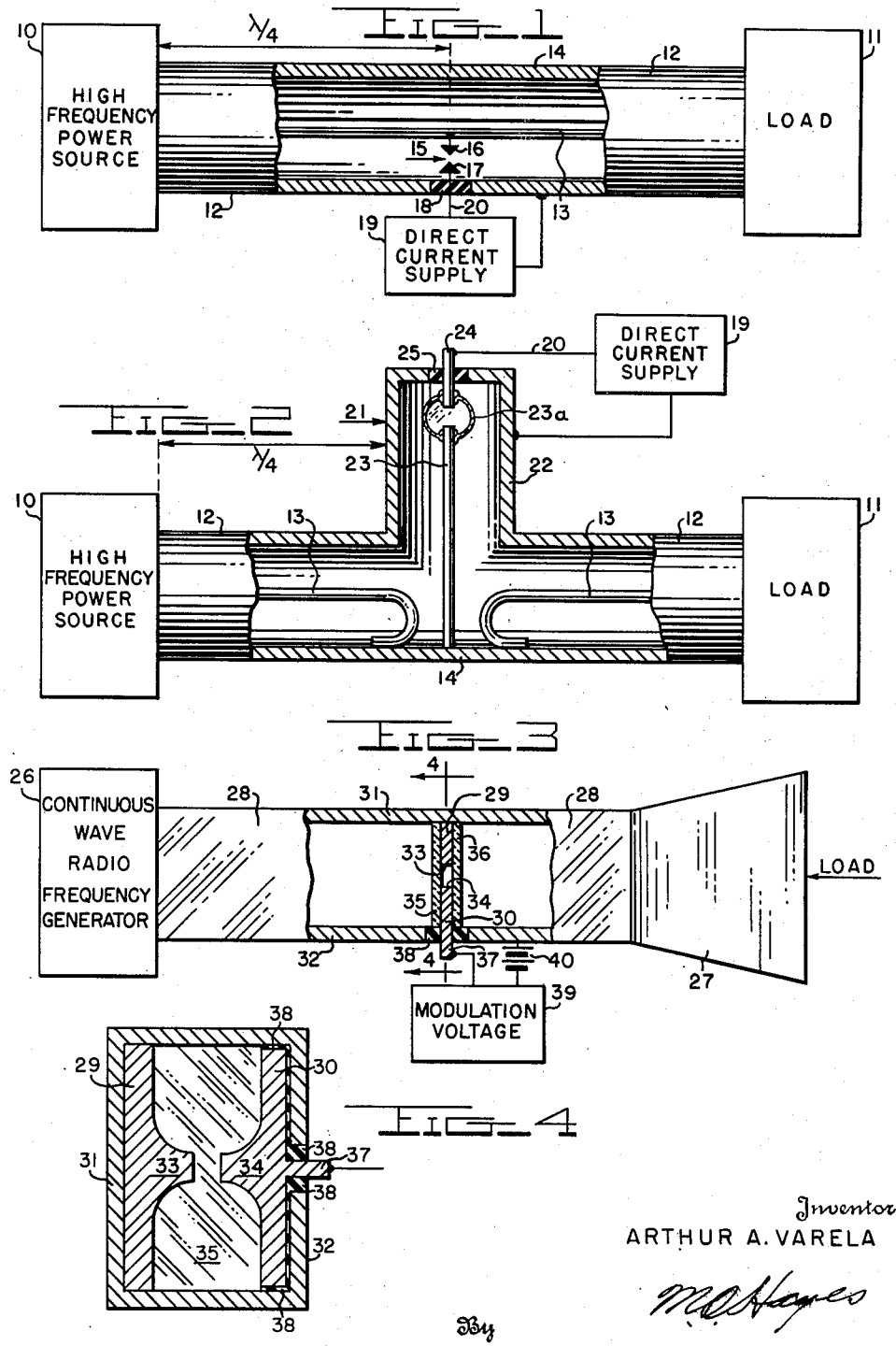
July 21, 1953  A. A. VARELA  2,646,550
CONTROLLED IMPEDANCE GAS DISCHARGE DEVICE
FOR MECHANICAL TRANSMISSION MEDIUMS
Filed Jan. 9, 1948
Inventor
ARTHUR A. VARELA Patented July 21, 1953

UNITED STATES PATENT OFFICE 2,646,550

CONTROLLED IMPEDANCE GAS DISCHARGE DEVICE FOR MECHANICAL TRANSMISSION MEDIUMS

Arthur A. Varela, Alexandria, Va.

Application January 9, 1948, Serial No. 1,423

2 Claims. (Cl. 333—81)

(Granted under Title 35, U. S. Code (1952), sec. 266)

This invention relates to high frequency power control systems and more particularly to systems for controlling transmission of high frequency power through mechanical transmission mediums.

Devices have been provided heretofore for controlling the transmission of electromagnetic energy through mechanical transmission mediums. However, such devices are not capable of transmitting varying degrees of energy between wide limits, from a condition of substantially zero power coupling to a condition of maximum power coupling for example. Furthermore, the prior devices are incapable of varying coupled high frequency power as a substantially linear function in accordance with a predetermined controlling influence.

It is therefore an object of the present invention to provide novel means for controlling the transmission of high frequency power through a mechanical transmission medium.

Another object is to provide novel means for controlling the transmission of electromagnetic energy through a mechanical transmission medium by varying the propagation characteristics of the medium without changing the physical characteristics thereof.

Another object is to provide novel means for varying the propagation characteristics of a mechanical transmission medium.

Another object is to provide novel means for controlling the transmission of high frequency power through mechanical transmission mediums by varying the propagation characteristics thereof as a substantially linear function in accordance with a predetermined controlling influence.

Still another object is to provide novel means having the foregoing characteristics to provide varying coupling of high frequency power through a mechanical transmission medium throughout a range from substantially zero power coupling to maximum power coupling as a substantially linear function in accordance with a predetermined controlling influence.

A still further object of the present invention is to provide novel means for modulating high frequency power.

A still further object is to provide a novel radio frequency modulator for modulating radio frequency energy at very high and ultra high frequencies.

Other objects and features of the present invention will appear more fully hereinafter from the following detailed description when considered in connection with the accompanying drawing which discloses several embodiments of the invention. It is to be expressly understood however that the drawing is designed for purposes of illustration only and not as a definition of the limits of the invention, reference for the latter purpose being had to the appended claims.

In the drawing, wherein similar reference characters denote similar elements throughout the several views:

Fig. 1 is a diagrammatic illustration of a system constructed in accordance with the principles of the present invention for controlling the transmission of high frequency power through a mechanical transmission medium;

Fig. 2 is a diagrammatic illustration of a system constructed in accordance with another embodiment of the invention for controlling the transmission of high frequency power through a mechanical transmission medium;

Fig. 3 is a diagrammatic illustration, partly in section, of a high frequency power modulator constructed in accordance with the principles of the present invention, and Fig. 4 is a sectional illustration through line 4—4 of Fig. 3.

With reference more particularly to Fig. 1 of the drawing, a system embodying the principles of the present invention for controlling the transmission of high frequency power through a mechanical transmission medium is disclosed therein in connection with a source of high frequency power 10, a load 11 and a mechanical transmission medium 12 coupling the source 10 to the load 11. The mechanical transmission medium 12 is disclosed in the form of a concentric transmission line including inner conductor 13 and outer conductor 14, however, it is to be expressly understood, that any conventional type of mechanical transmission medium may be employed in connection with the present invention, such as parallel transmission lines or wave guides of the hollow type having rectangular or circular cross section. The control system includes a voltage discharge device 15 positioned in the mechanical transmission medium 12. The voltage discharge device 15 may take the form of a spark gap including electrode 16, connected to the inner conductor 13, and an electrode 17 supported by the outer conductor 14 in spaced relationship with the electrode 16. For a purpose that will appear more fully hereinafter the electrode 17 is insulated from the outer conductor 14 by means of suitable insulating material 18. The voltage discharge device 15 is designed and calibrated to produce a voltage discharge across the electrodes 16 and 17 in response to high frequency power from the source 10, when the electrode 17 is maintained at a potential equal to the potential of the outer conductor 14. The voltage discharge device 15 is further designed and calibrated so that the voltage discharge produced across the electrodes 16 and 17, under the foregoing conditions, presents a sufficiently low impedance, with respect to the characteristic impedance of the medium 12, to establish an effective short circuit across the transmission medium 12. Such effective short circuit varies the normal propagation characteristics of the medium 12 in such a manner so that substantially no power is coupled to the load 11. In some instances it may be desirable to position the voltage discharge device 15 a predetermined distance from the input terminals of the transmission medium 12 equal to an odd multiple, including one, of electrical quarter wave lengths of the frequency of the source 10. With such an arrangement, the low impedance or short circuit appearing across the medium 12 at the voltage discharge device 15 is inverted as an open circuit at the input terminals of the transmission medium 12 in a manner well understood by those skilled in the art.

As mentioned heretofore, one of the objects of the present invention is to provide means for varying the impedance value of the voltage discharge produced by the voltage device 15 to control transmission of high frequency power through the mechanical transmission medium 12 in accordance with a predetermined controlling influence. It has been found that the establishment of a direct current potential differential in the voltage discharge device 15, by increasing the potential on the electrode 17 with respect to the potential of the outer conductor 14 for example, increases the impedance of the voltage discharge in accordance therewith. As shown in Fig. 1, the foregoing means comprises a direct current supply 19 coupled to the electrode 17 through conductor 20. The direct current supply 19 may be constructed in any conventional manner capable of providing a predetermined value of direct current potential variable throughout a wide range. Since the electrode 17 is insulated from the outer conductor 14 by the insulating material 18 the direct current supply 19 is operable to establish predetermined potential differentials between the electrode 17 and the outer conductor 14 thereby controlling the voltage discharge impedance substantially in proportion to the value of direct current potential applied.

As stated heretofore, when no direct current bias is applied to the electrode 17 from the direct current supply 19, that is, when the outer conductor 14 and the electrode 17 are maintained at equal potential, the voltage discharge device 15 is responsive to the energizing high frequency power from the source 10 to produce a voltage discharge having an impedance of sufficiently low value to establish an effective short circuit in the transmission medium 12. Under the foregoing conditions, substantially no power is coupled to the load 11. When a potential differential is established between the electrode 17 and the outer conductor 14, in accordance with operation of the direct current supply 19, the impedance of the voltage discharge is increased thereby allowing transmission of power to the load 11 substantially in proportion to the established potential differential. As will appear more fully hereinafter, by controlling the direct current supply 19 in such a manner as to apply a potential differential between the electrode 17 and the outer conductor 14 in accordance with a predetermined controlling influence the high frequency power from the source 10 is coupled to the load 11 attenuated substantially in proportion to such predetermined controlling influence.

Another embodiment of the present invention is disclosed in Fig. 2 of the drawing. In this embodiment the voltage discharge device is connected to the mechanical transmission medium 12 through an impedance transformer means to provide more accurate control of high frequency power transmission in accordance with operation of the direct current supply 19. As shown, the high frequency power from the source 10 is coupled to the load 11 through the mechanical transmission medium 12. An impedance transformer means is disclosed in the form of a resonant line section 21, having outer conductor 22 and inner electrode 23, coupled to the mechanical transmission medium 12 in a conventional manner. The resonant line section 21 further includes electrode 24 centrally positioned at the high impedance end thereof in predetermined spaced relationship with the upper end of the central electrode 23 to form a spark gap or voltage discharge device. The voltage discharge electrodes may be enclosed by glass bulb 23a containing an inactive gas such as hydrogen under appropriate pressure. The electrode 24 is insulated from the outer conductor 22 by means of suitable insulating material 25 and is connected to the output of the direct current supply 19 through the conductor 20.

In operation of the embodiment disclosed in Fig. 2, the resonant line section 21 functions as an impedance transformer to apply voltages across the electrodes 23 and 24 a predetermined degree greater than the voltages energizing the mechanical transmission medium 12, and, when a voltage discharge is produced, to establish an impedance in the medium 12 a corresponding degree less than the impedance of the voltage discharge. As shown in Fig. 2, the resonant line section 21 is short circuited at its lower end by the connection of its central conductor 23 to the outer conductor 14. The resonant line section is a quarter wave in length and the coupling of the main line 12 into and out of section 21 is electromagnetic by means of coupling loops in central conductor 13. When a discharge occurs across electrodes 23 and 24, line section 21 becomes effectively shorted at both ends and the resonance is destroyed. When the resonance is destroyed the electromagnetic coupling is destroyed between the right and left sections of transmission medium 12, and energy from source 10 is not delivered to load 11. The voltage discharge device may be designed and calibrated, when no potential differential exists between the electrode 24 and the outer conductor 22, to produce a low impedance voltage discharge, in response to low power level energization, and to establish a still lower impedance value across the transmission medium 12 effective to completely short circuit the medium. Such an arrangement is especially advantageous in instances where the impedance of the voltage discharge substantially corresponds to the characteristic impedance of the medium 12. Furthermore, since the impedance of the voltage discharge is reflected to the transmission medium 12 as a lower value determined by the impedance transforming characteristics of the resonant line section 21, more accurate control of high frequency power transmission is provided upon operation of the direct current supply 19. Although the impedance transformer means is disclosed in the form of a resonant line section it is to be expressly understood that other conventional impedance transformer means may be utilized in connection with the present invention, for example, a resonant cavity or a resonant iris may be readily employed when the particular type of mechanical transmission medium and the frequency of the energizing power dictate such use.

Fig. 3 of the drawing discloses a system embodying the principles of the present invention for modulating high power electromagnetic energy. As shown, the system includes a source of electromagnetic energy such as a radio frequency generator 26 for producing continuous wave radio frequency energy, or periodic radio frequency pulse energy, at any predetermined frequency, including very high and ultra high frequencies, a load element such as a horn radiator 27 and a mechanical transmission medium 28, shown in a form of a hollow wave guide having a rectangular cross section, coupling the output of the generator 26 to the radiator 27. In order to modulate the radio frequency energy output from the generator 26 and to couple such modulated radio frequency energy to the load 27 means are provided for establishing a variable impedance in the wave guide 28 to vary the propagation characteristics thereof in accordance with the value of the established impedance, and for varying the value of such impedance in accordance with a predetermined controlling influence, such as a modulation voltage. The foregoing means, with additional reference to Fig. 4, comprises a coupling iris and voltage discharge device including metallic tabs 29 and 30 extending inwardly from opposite sides 31 and 32, respectively of the wave guide 28. The intermediate portion of the tabs 29 and 30 are extended inwardly a greater extent than the remaining portion thereof. The portions 33 and 34 are terminated in predetermined spaced relationship to form a voltage discharge path therebetween. Suitable dielectric windows 35 and 36 are sealed on opposite sides of the tabs 29 and 30 throughout the cross-sectional area of the wave guide, to define an envelope enclosing the voltage dicharge path. The envelope may be filled with a suitable gas, such as hydrogen, under low pressures, to form a sensitive voltage discharge device in a manner well understood by those skilled in the art. The tab 30 includes a portion 37 extending outwardly therefrom beyond the wall 32 of the wave guide, and the tab 30, including the portion 37, is insulated from the wave guide by means of suitable insulating material 38. A modulation voltage generator 39 and a source of direct current 40 are serially connected between the wave guide 28 and the portion 37 for applying a modulated direct current bias to the tab 30.

In operation of the high frequency power modulator disclosed in Figs. 3 and 4 the coupling iris and voltage discharge device is calibrated to produce, in response to the radio frequency output of the generator 26, a voltage discharge offering an impedance of sufficient value to short circuit the wave guide 28 when no direct current potential differential exists between the tabs 29 and 30, the latter condition occurring when zero modulation voltage is produced by the modulation voltage generator 39. The value of the direct current source 40 is selected to be equal to or greater than the direct current differential required to prevent formation of the voltage discharge. Since the direct current bias applied to the tab 30 is proportional to the modulation voltage produced by the modulation voltage generator 39 the degree of the radio frequency power coupled to the radiator 27 is proportional to the modulation voltage. This arrangement provides efficient means for modulating high power continuous wave radio frequency energy, or pulsating radio frequency energy, at very high and ultra high frequencies.

An explanation of the theory of operation of why the voltage discharge impedance is increased when the direct current potential is increased between electrode 17 and the outer conductor 14 is found in the January 15, 1947, issue of the magazine, The Physical Review, pages 124, 125, in an article titled Effect of Direct-Current Potential on Initiation of Radiofrequency Discharge by A. A. Varela.

There is thus provided by the present invention novel means for controlling the transmission of high frequency power through mechanical transmission mediums. The arrangement is such that the propagation characteristics of the mechanical transmission medium are varied in accordance with a predetermined controlling influence without changing the physical characteristics thereof. With such an arrangement, high frequency power energizing a mechanical transmission medium is controllable to prevent coupling of power therethrough or to allow maximum power transfer attenuated only by inherent characteristics of the transmission medium; to allow transfer of a predetermined degree of the energizing power, and to modulate high power radio frequency energy by varying the transfer of energizing power in accordance with a predetermined modulating influence.

Although several embodiments of the invention have been disclosed and described herein it is to be expressly understood that various changes and substitutions may be made therein without departing from the spirit of the invention as well understood by those skilled in the art. Reference therefore will be had to the appended claims for a definition of the limits of the invention.

The invention described herein may be manufactured and used by or for the Government of the United States of America for governmental purposes without the payment of any royalties thereon or therefor.

What is claimed is:

1. An apparatus for controlling the transfer of electromagnetic energy through a transmission line comprising, a source of electromagnetic energy feeding one end of said line, a two electrode voltage discharge device having one electrode directly connected to one side of said line, and a variable direct current source connected between said other electrode and the other side of said line to bias said other electrode with respect to said other side of the line.

2. An apparatus for controlling the transfer of electromagnetic energy through a transmission line comprising, a source of electromagnetic energy feeding one end of said line, a two electrode voltage discharge device positioned in said line an odd integral number of quarter wave lengths from said one end, said quarter wave lengths being measured by the frequency of said electromagnetic energy source, one electrode of said discharge device being connected to one side of said line at the place where said device is positioned therein, and a variable direct current source connected between said other electrode and the other side of said line to bias said other electrode with respect to said other side of the line.

ARTHUR A. VARELA.

References Cited in the file of this patent

UNITED STATES PATENTS

| Number | Name | Date |
|---|---|---|
| 2,106,770 | Southworth | Feb. 1, 1938 |
| 2,189,584 | Hollmann | Feb. 6, 1940 |
| 2,408,055 | Fiske | Sept. 24, 1946 |
| 2,408,425 | Jenks | Oct. 1, 1946 |
| 2,412,315 | Brown | Dec. 10, 1946 |
| 2,412,751 | Rochester | Dec. 17, 1946 |
| 2,413,963 | Fiske | Jan. 7, 1947 |
| 2,416,168 | Fiske | Feb. 18, 1947 |
| 2,422,190 | Fiske | June 17, 1947 |
| 2,439,651 | Dome | Apr. 13, 1948 |
| 2,531,122 | Fiske | Nov. 21, 1950 |
| 2,544,842 | Lawson | Mar. 13, 1951 |
| 2,557,961 | Goldstein et al. | June 26, 1951 |
| 2,560,859 | Gutton et al. | July 17, 1951 |